United States Patent [19]

Martinie et al.

[11] Patent Number: 5,685,650
[45] Date of Patent: Nov. 11, 1997

[54] BEARING ASSEMBLY UTILIZING IMPROVED CLAMPING ARRANGEMENT

[75] Inventors: Howard M. Martinie, Simpsonville; Roman M. Wajda, Greer, both of S.C.

[73] Assignee: Allen-Bradley Company, Inc., Milwaukee, Wis.

[21] Appl. No.: 587,028

[22] Filed: Jan. 16, 1996

[51] Int. Cl.⁶ .................................................. F16L 27/04
[52] U.S. Cl. ........................ 384/538; 384/585; 403/370
[58] Field of Search ............................. 384/538, 540, 384/581, 584, 585, 539, 903; 403/370

[56] References Cited

U.S. PATENT DOCUMENTS

| | | | |
|---|---|---|---|
| 738,445 | 9/1903 | Hoffmann | 384/540 |
| 1,526,008 | 2/1925 | Olson | 384/540 |
| 1,843,463 | 2/1932 | Tawresey | 29/898.08 |
| 2,043,272 | 6/1936 | Wallgren | 384/272 |
| 2,118,885 | 5/1938 | Hughes | 384/538 |
| 2,650,867 | 9/1953 | Spieth | 384/540 |
| 3,033,597 | 5/1962 | Miller | 403/15 |
| 3,497,274 | 2/1970 | Yardley | 384/583 |
| 3,807,820 | 4/1974 | Schuhmann | 384/538 |
| 3,953,142 | 4/1976 | Price et al. | 403/371 |
| 4,288,172 | 9/1981 | Livesay et al. | 403/317 |
| 4,345,851 | 8/1982 | Soussloff | 403/369 |
| 4,364,687 | 12/1982 | Adell | 403/370 |
| 4,647,230 | 3/1987 | Friedrich et al. | 384/903 X |
| 5,009,539 | 4/1991 | Muellenberg | 403/370 |
| 5,011,306 | 4/1991 | Martinie | 384/585 |
| 5,067,847 | 11/1991 | Muellenberg | 403/370 |
| 5,269,607 | 12/1993 | Lawson | 384/538 |
| 5,373,636 | 12/1994 | Martinie | 29/898.08 |
| 5,489,156 | 2/1996 | Martinie | 384/538 |

FOREIGN PATENT DOCUMENTS

| | | |
|---|---|---|
| 0235366A2 | 9/1987 | European Pat. Off. . |
| 0328759A1 | 8/1989 | European Pat. Off. . |
| 0424584A1 | 5/1991 | European Pat. Off. . |
| 15398 | 12/1909 | United Kingdom . |
| 897776 | 10/1953 | United Kingdom . |
| 2120360 | 11/1983 | United Kingdom . |

OTHER PUBLICATIONS

An article entitled "Keyless Bushing Keeps Shafts Strong," *Machine Design*, vol. 65, No. 12, p. 12 (Jun. 25, 1993).

Primary Examiner—Thomas R. Hannon
Attorney, Agent, or Firm—Patrick S. Yoder; John M. Miller; John J. Horn

[57] ABSTRACT

A bearing assembly includes an improved clamping arrangement for securement to a shaft. The inner ring of the bearing assembly includes a tapered inner surface generally complementary to a tapered outer surface of a tapered adapter. Each of the tapered adapter and the inner ring member include an axial extension portion which are situated to be proximate one another during use. A nut is provided interconnecting the extension portions such that relative axial movement may be effected between the inner ring member and the tapered adapter. As a result, the bearing assembly may be secured to or removed from the shaft.

12 Claims, 10 Drawing Sheets

BEARING ASSEMBLY UTILIZING IMPROVED CLAMPING ARRANGEMENT

BACKGROUND OF THE INVENTION

The present invention relates generally to means for clamping a bearing assembly to an elongated shaft. More particularly, the invention relates to a bearing assembly incorporating an improved arrangement to effect securement thereof to a shaft.

Bearing assemblies are often designed to be quickly attached to a shaft. Typically, the bearing assembly is first slipped along the shaft to the desired position. Once there, the inner ring of the bearing assembly is secured to the shaft utilizing one of various clamping techniques.

A common clamping technique involves the use of a tapered adapter having a tapered outer surface. Such an adapter defines an axial bore for receipt of a shaft therethrough and further defines a radial slot extending along its length. A bearing assembly having a receiving bore with a tapered inner surface is situated about the tapered adapter. The bearing assembly and the tapered adapter are forced axially into one another. As a result, the tapered adapter is closed around the shaft. Further movement of the bearing assembly along the tapered outer surface achieves a press fit between the various components.

Generally, bearing assemblies utilizing tapered adapters have been commercially available in two general types, a pull type and a push type. In the pull type, threads are defined on the tapered adapter adjacent its lesser diameter end. A lock nut is tightened onto the threads to "pull" the tapered adapter into the shaft bore of the bearing assembly. One exemplary pull-type adapter is illustrated in U.S. Pat. No. 5,011,306, issued Apr. 30, 1991 to Martinie and incorporated herein by reference.

A limitation of this design is the large cross section required to accommodate threads situated at the lesser diameter end of the tapered adapter. In addition, this design has often been difficult to disassemble. Specifically, a lack of a convenient means to remove the bearing from the adapter has frequently resulted in destruction of the bearing during removal. This has resulted in lost equipment service due to the long removal time, as well as costs associated with any destruction of the bearing.

The push type adapter also has limitations in practical service. Specifically, this design has often required a special shoulder against which the bearing is abutted on one side. Further, threads are typically defined about the shaft for receiving a nut abutting the tapered adapter on the other side. As the nut is tightened, the tapered adapter is "pushed" into the shaft bore of the bearing assembly. Another nut must generally be provided to remove the adapter from the bearing assembly and shaft. It will be appreciated that the special features of the shaft in this design contribute to considerable expense in manufacture and service.

SUMMARY OF THE INVENTION

The present invention recognizes and addresses the foregoing disadvantages, and others, of prior art constructions and methods. Accordingly, it is an object of the present invention to provide a bearing assembly having an improved clamping arrangement.

It is another object of the present invention to provide an improved bearing clamping assembly for securing a bearing to an elongated shaft.

It is a more particular object of the present invention to provide an improved clamping arrangement which facilitates securement and removal from the same axial side thereof.

Some of these objects and achieved by a bearing assembly for receipt of a shaft therein. Such a bearing assembly comprises a tapered adapter defining a first axial bore for receipt of the shaft therethrough, the tapered adapter having a radial slot extending along the length thereof. The tapered adapter further defines a tapered outer surface extending between a first end of lesser diameter and a second end of greater diameter than the first end.

The bearing assembly also includes a bearing inner ring member defining an inner race way about an outer surface thereof. The bearing inner ring member further defines a second axial bore having a tapered inner surface extending between a third end of greater diameter and a fourth end of lesser diameter than the third end. The tapered adapter is received in the second axial bore of the bearing inner ring member.

A bearing outer ring member defines an outer race way about an inner surface thereof. The outer ring member is situated such that the outer race way is radially outward of the inner race way defined by the inner ring member. A plurality of bearing elements are disposed between the inner race way and the outer race way to permit relative rotation between the inner ring member and the outer ring member.

The tapered adapter further includes a first extension portion axially extending from one of the first end and the second end. Similarly, the inner ring member includes a second extension portion axially extending from one of the third end and the fourth end such that the second extension portion will be proximate to the first extension portion during use.

A nut is provided having a first axial portion for receipt around the first extension portion and a second axial portion for receipt around the second extension portion. The nut functions to interconnect the tapered adapter and the inner ring member to effect relative axial movement therebetween. As a result, the bearing assembly may be selectively secured or removed from the shaft.

In some exemplary constructions, the first extension portion axially extends from the second end of the tapered adapter and the second extension portion axially extends from the third end of the inner ring member. In such embodiments, the first extension portion may define outer threads which operatively engage inner threads defined by the first axial portion of the nut. Respective circumferential grooves may be defined by the inner ring member and the second axial portion of the nut which are situated during use in radial opposition to one another. An annular space is thus defined between the circumferential grooves into which at least one arcuate member is disposed.

In embodiments utilizing opposed circumferential grooves, the nut may comprise a unitary nut having both of the first axial portion and the second axial portion. Preferably, the second circumferential groove will be defined in such embodiments having sufficient depth to receive the arcuate member during alignment of the respective grooves. The nut may further include at least one radial screw for maintaining the arcuate members partially in both of the circumferential grooves during use. The second circumferential groove may be made more shallow if the nut is configured as two annular nut elements connected together and interfacing at the second circumferential groove.

In some exemplary constructions, the arcuate members collectively comprise a pair of substantially semi-circular members. Each of the substantially semi-circular members preferably has a reduced width at respective opposite ends to facilitate clearance during alignment of the circumferential grooves. Such arcuate members may have notches defined in their outer arcuate surface to receive a portion of an associated radial screw. In other exemplary constructions, three or more arcuate members may be provided. A shroud member may circumferentially surround the arcuate members in such embodiments.

In other exemplary embodiments, the at least one arcuate member comprises an annular interconnection ring, preferably a radially-compressible snap ring. In such embodiments, the nut may define a loading surface tapering from an axial end of the second axial portion toward the circumferential groove therein. Such a loading surface may be used during assembly to compress the ring into the circumferential groove of the inner ring member as the opposed grooves are aligned.

Other exemplary constructions are provided having a circumferential lip extending about at least a portion of an inner surface of the second axial portion of the nut. This lip engages the circumferential groove in the second extension portion or a flange extending about the second extension portion. In such embodiments, the nut may include a plurality of nut segments adapted to be secured together into a rigid member. Each of the nut segments defines an arcuate shaft receiving portion arranged so that when the nut is secured together the nut segments define a circular interior for receiving the first extension portion and the second extension portion.

In some exemplary constructions, the second extension portion of the tapered adapter may define outer threads operatively engaging inner threads defined by the second axial portion of the nut. In such embodiments, the first extension portion of the tapered adapter may include a circumferential flange and the second axial portion of the nut may include a circumferential groove for receiving the flange. Preferably, an inner side wall of the circumferential groove is defined by a flange having an inner diameter greater than an outer diameter of the circumferential lip upon closure of the radial slot in the tapered adapter.

Other objects of the invention are achieved by a method of securing a bearing assembly to a shaft. The method comprises the step of providing suitable apparatus comprising a suitable tapered adapter, bearing assembly and nut. The tapered adapter has outer threads at an extension portion situated proximate the larger diameter end thereof for engaging inner threads defined in the nut. A second extension portion axially extending from the bearing inner ring member defines a first circumferential groove which may be axially aligned with a second circumferential groove defined in the nut. At least one arcuate member is further provided of a size to be received in the circumferential grooves.

A further step of the method involves placing the bearing assembly on the tapered adapter such that the respective tapered surfaces thereof are generally complementary. As an additional step, the arcuate members are placed into the second circumferential groove. A further step involves threading the nut onto the tapered adapter until the circumferential grooves are in radial alignment. Additionally, a portion of the arcuate members are moved out of the second circumferential groove and into the first circumferential groove such that the nut and the bearing assembly will be connected. After the arcuate members are in position and the nut is placed about the extension portions, the nut is further rotated to effect relative axial movement between the bearing assembly and the tapered adapter. Preferably, the arcuate members are moved into the first circumferential groove by tightening radial screws provided in the nut.

In one preferred methodology, the at least one arcuate member comprises an annular connection ring, preferably a radially-compressible snap ring. Furthermore, the nut may define a loading surface tapering from an axial end of the second axial portion toward the circumferential groove therein. In this case, the nut may be axially moved onto the inner ring member such that the loading surface will compress the ring into the first circumferential groove. When the opposed grooves are aligned, the connection ring will expand to connect the nut and inner ring member, as desired.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
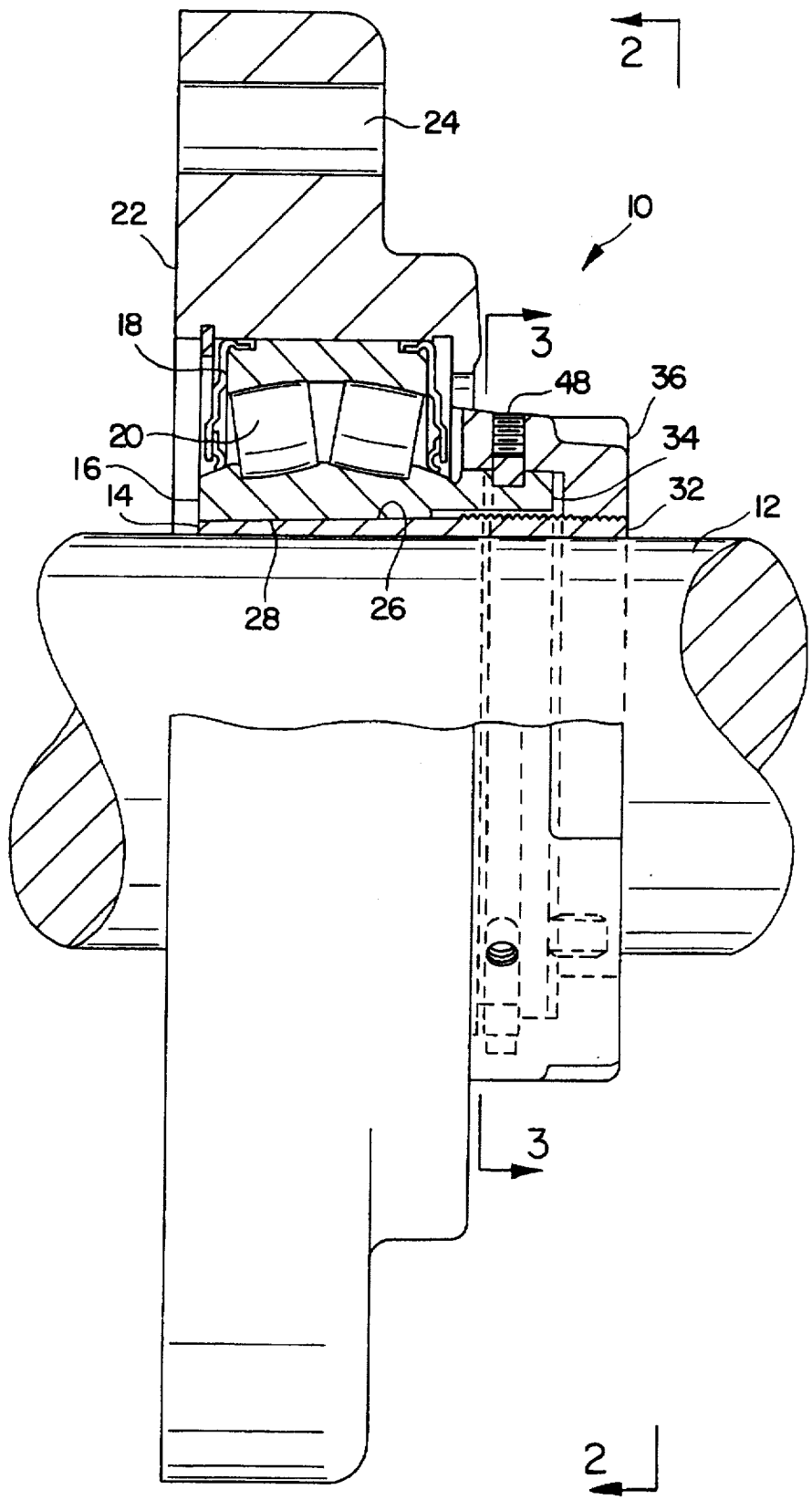
FIG. 1 is a partial cross-sectional view of one embodiment of a bearing assembly constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions.

Figure 2:
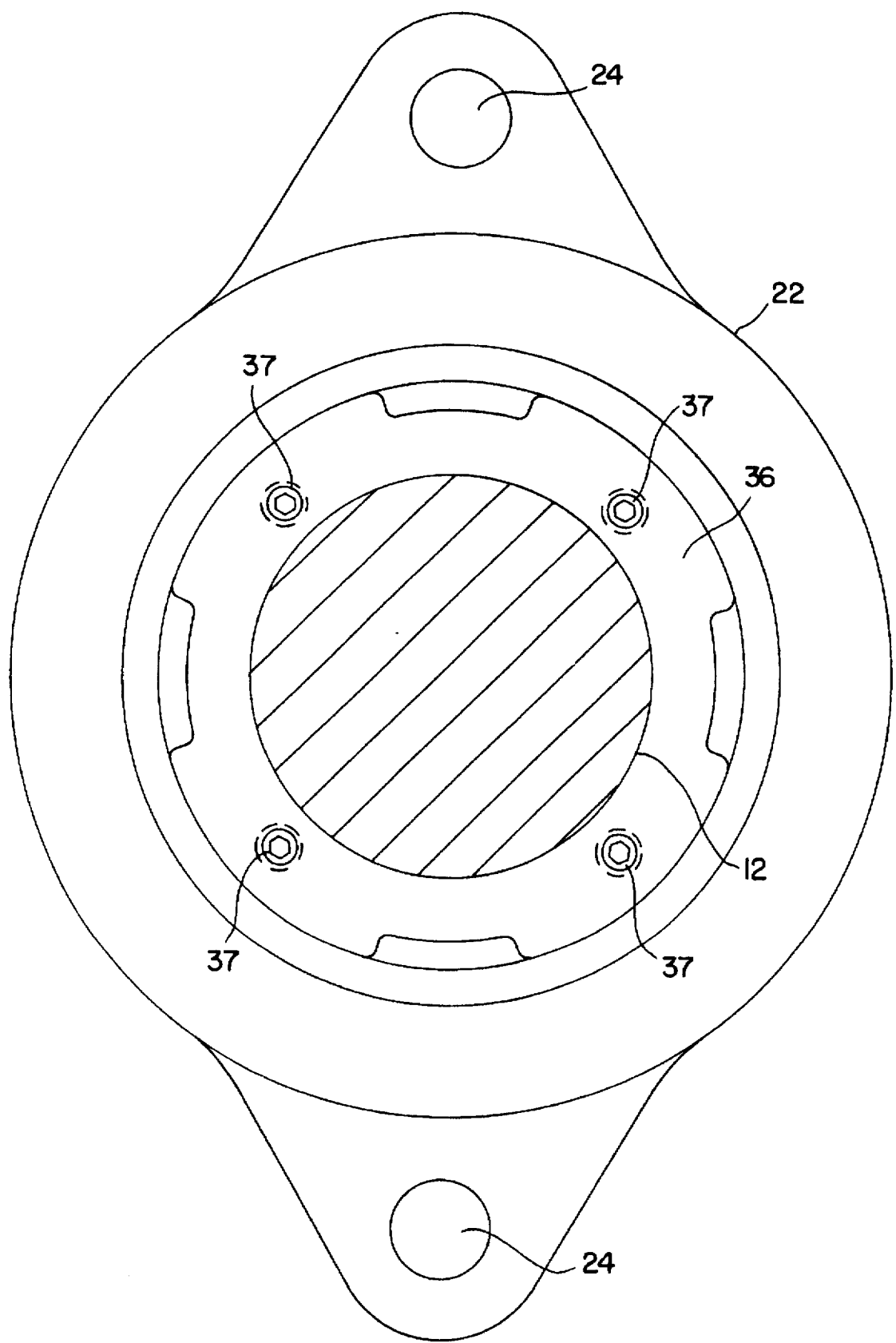
FIG. 2 is a front elevational view of the bearing assembly of FIG. 1 as taken along lines 2—2.
Figure 3:
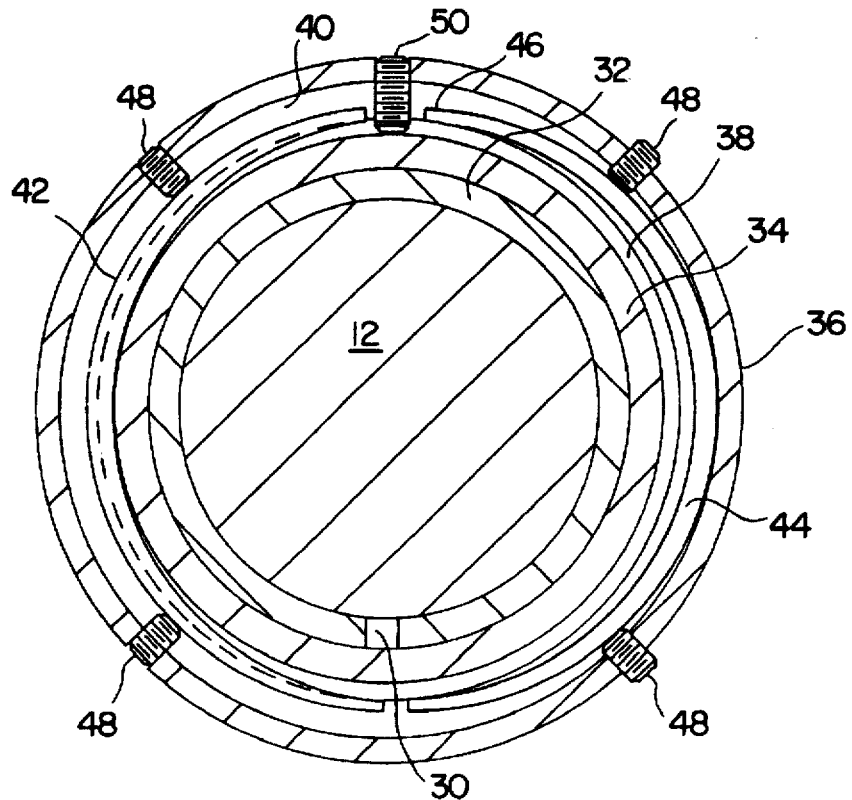
FIG. 3 is a cross-sectional view of the bearing assembly of FIG. 1 as taken along lines 3—3.

Referring now to FIGS. 1 through 3, a bearing assembly (generally indicated at 10) constructed in accordance with the present invention is shown secured to a shaft 12. Bearing assembly 10 includes a tapered adapter 14 through which shaft 12 extends. A bearing inner ring member 16 is received about tapered adapter 14, as shown. Inner ring member 16 defines an inner race way about its outer circumferential surface. An outer ring member 18 is provided having an outer race way situated in opposition to the inner race way defined on inner ring member 16. A plurality of bearing elements, such as roller bearings 20 are disposed between the inner race way and the outer race way to facilitate relative rotation between ring members 16 and 18. While roller bearings are illustrated, it should be appreciated that other suitable types of bearing elements, such as ball bearings, may also be utilized.

It can be seen that bearing assembly 10 further includes a housing 22. Housing 22 is configured as a flange housing such that bearing assembly 10 may be mounted to a suitable wall or plate through which shaft 12 extends. In the illustrated construction, such a wall would be juxtaposed to the left side of bearing assembly 10 in the orientation of FIG. 1. Housing 22 may be maintained to the wall by bolts (not shown) inserted through bores 24 defined in housing 22.

Tapered adapter 14 includes a first end of a lesser diameter extending to a second end of greater diameter. A tapered outer surface 24 is thus defined between these ends of adapter 14. As shown, inner ring member 16 defines a tapered inner surface 28 generally complementary to tapered outer surface 26. Adapter 14 further defines a radial opening, or slot, 30 extending along its entire axial length, as can be most easily seen in FIG. 3. Radial opening 30 allows adapter 14 to contract as tapered outer surface 26 and tapered inner surface 28 are moved axially together. As a result, positive clamping of bearing assembly 10 with respect to shaft 12 is achieved.

Tapered adapter 14 further includes an extension portion 32 axially extending from the larger diameter end of tapered outer surface 26. Similarly, inner ring member 16 also includes an extension portion 34 axially extending from the larger diameter end of tapered inner surface 28. A nut 36 includes a first axial portion having inner threads for engaging outer threads defined about extension portion 32. As will be described more fully below, nut 36 is also suitably connected to inner ring member 16 via extension portion 34 such that axial movement of nut 36 will cause corresponding axial movement of inner ring member 16. Preferably, however, the connection of nut 36 to extension portion 34 will allow free rotation of nut 36 with respect thereto. Thus, tightening of nut 36 will cause tapered outer surface 26 and tapered inner surface 28 to be moved into engagement. Rotation of nut 36 in the opposite direction will cause tapered outer surface 26 and tapered inner surface 28 to be moved out of engagement. A plurality of axial set screws 37 are also provided threadingly received in holes extending through nut 36 screws 37 engage inner ring member 16 to facilitate removal thereof out of engagement with tapered adapter 14 in a similar manner to that described in U.S. Pat. No. 5,373,636, issued Dec. 20, 1994, incorporated herein by reference.

Referring now particularly to FIG. 3, a preferred manner by which nut 36 may be suitably connected to inner ring member 16 is illustrated. In this embodiment, a circumferential groove 38 is defined about the outer surface of extension portion 32. Similarly, another circumferential groove 40 is defined about the inner surface of the second axial portion of nut 36. In use, grooves 38 and 40 are radially opposed to define therein an annular space. Appropriate arcuate members are disposed in this annular space to connect nut 36 with inner ring member 16 in the manner described. In the illustrated embodiment, such arcuate members comprise a pair of substantially semicircular arcuate members 42 and 44.

To permit nut 36 to be received over extension portion 34 during alignment of grooves 38 and 40, groove 40 is of a sufficient depth to permit members 42 and 44 to be received entirely therein. As can be seen, members 42 and 44 taper to a reduced width at their respective end portions, such as end portion 46 of member 44. The reduced width of these end portions permits the depth of groove 40 to be more shallow than would be the case if the width of members 42 and 44 remained constant.

Nut 36 is further equipped with a plurality of radial set screws 48 extending into groove 40. Retraction of set screws 48 permits arcuate members 42 and 44 to be received in groove 40 for alignment of grooves 38 and 40 as described above. After grooves 38 and 40 are in alignment, set screws 48 may be tightened to push arcuate members 42 and 44 partially into groove 38. For purposes of illustration, arcuate member 42 is shown in position for use whereas member 44 is out of position for groove alignment. A further set screw 50 may be provided to prevent arcuate members 42 and 44 from shifting position during operation of bearing assembly 10.

Figure 3A:
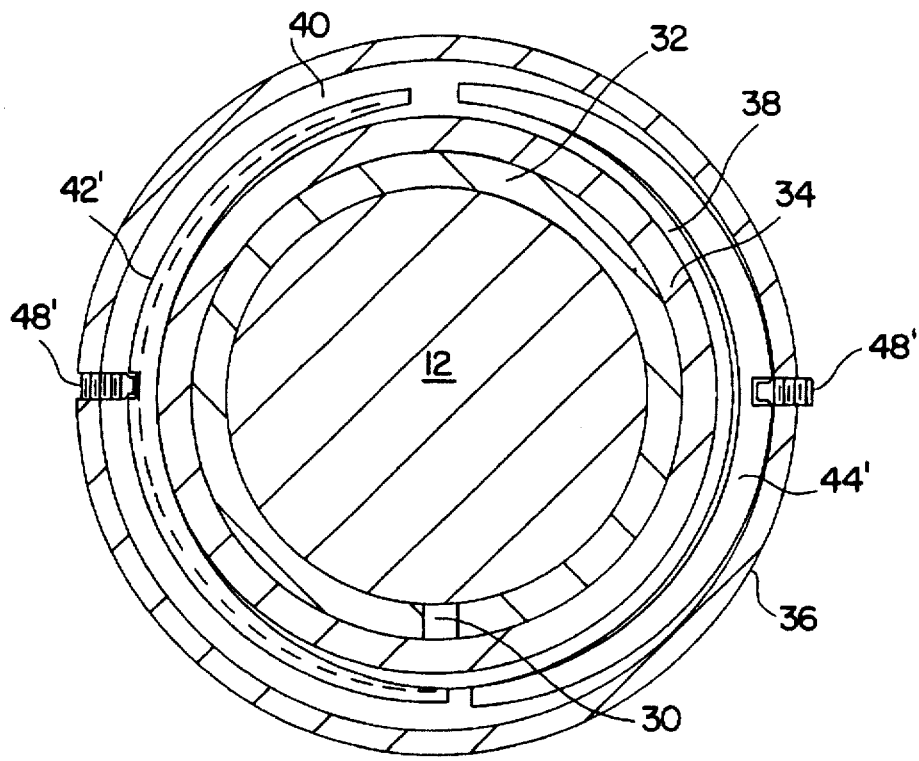
FIG. 3A is a view similar to FIG. 3 illustrating a modification of the substantially semicircular arcuate members thereof.

FIG. 3A illustrates a modification of the embodiment of FIG. 3 which is simplified in some respects. In this case, arcuate members 42' and 44' each define a radial notch in their outer arcuate surface. As shown, the radial notches receive a portion of radial screws 48'. It will be appreciated that these radial notches prevent members 42' and 44' from shifting position during use. Thus, an additional set screw such as screw 50 may not be necessary.

Figure 3B:
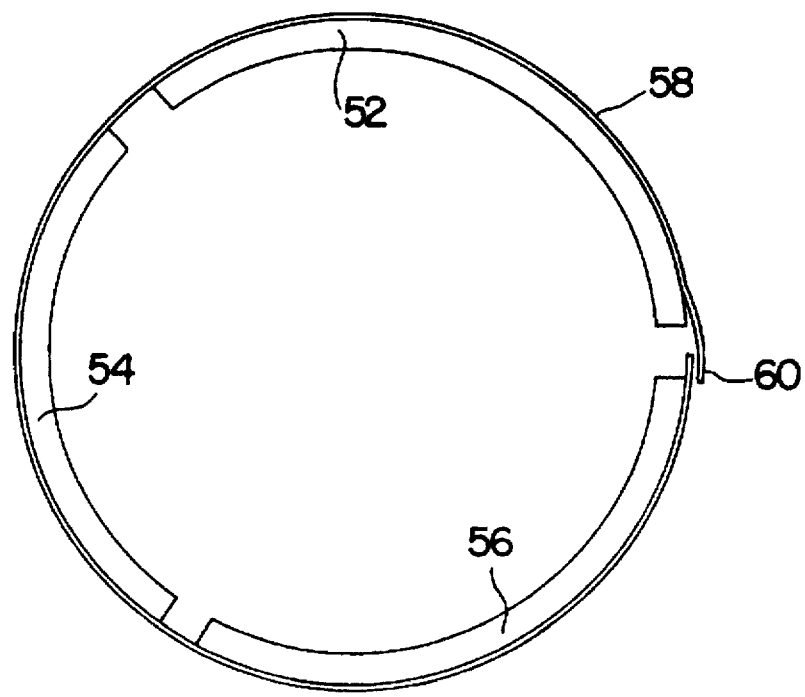
FIG. 3B is an elevational view diagrammatically illustrating alternative arcuate members for interconnecting the bearing inner ring member and the nut.

FIG. 3B illustrates an alternative configuration for the arcuate members. In this case, three arcuate members 52, 54 and 56 are provided. When members 52, 54 and 56 are out of position, a space will be defined between adjacent ends thereof, as shown. This space will preferably be completely closed when members 52, 54 and 56 are in position, resulting in a substantially continuous ring. A band, or "shroud," 58 may be provided to circumferentially surround members 52, 54 and 56. As shown, shroud 58 is split, partially overlapping as indicated at 60. Thus, as members 52, 54 and 56 are moved into position, the diameter of shroud 58 may appropriately contract.

Figure 4:
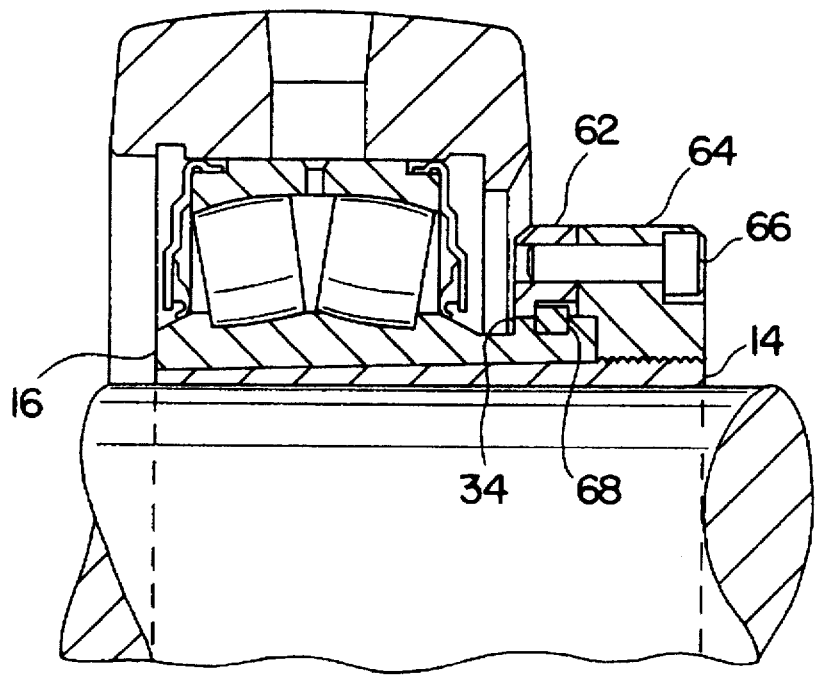
FIG. 4 is a partial cross-sectional view of another embodiment of a bearing assembly constructed in accordance with the present invention.

FIG. 4 illustrates another embodiment similar in many respects to the embodiment of FIGS. 1 through 3. Unlike the embodiment of FIGS. 1 through 3, however, the nut is constructed in this case of two annular nut segments 62 and 64. Segments 52 and 54 are connected together by bolts, such as bolt 66, or other suitable means. As shown, an inner circumferential groove is defined by the interface of segments 62 and 64. In this construction, the arcuate members, such as arcuate member 68, are simply placed in the groove of extension portion 34 before elements 62 and 64 are mated. When elements 62 and 64 are mated, the arcuate members will be captured in the annular space defined by the opposed grooves.

Figure 5:
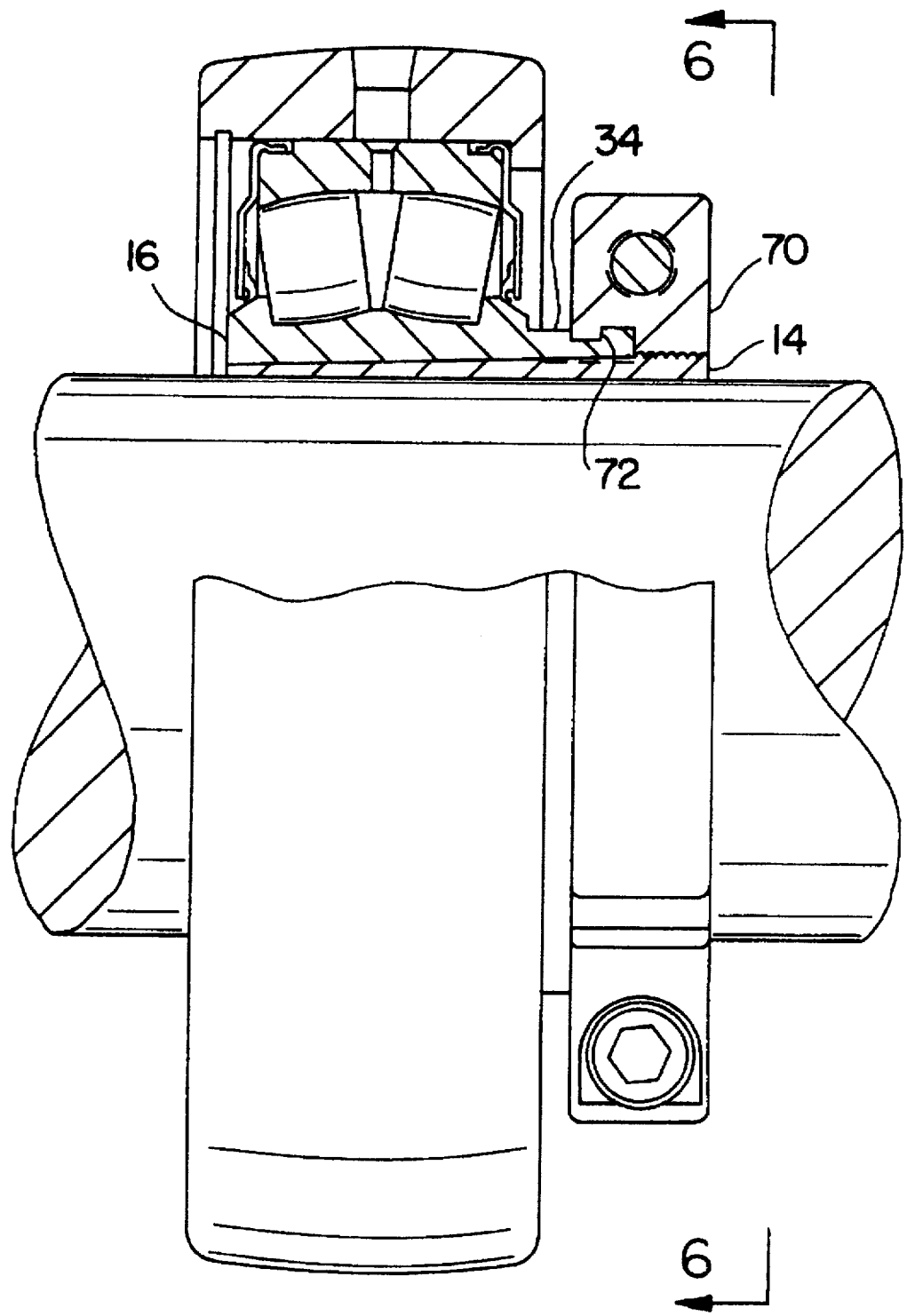
FIG. 5 is a partial cross-sectional view of a still further embodiment of a bearing assembly constructed in accordance with the present invention.
Figure 6:
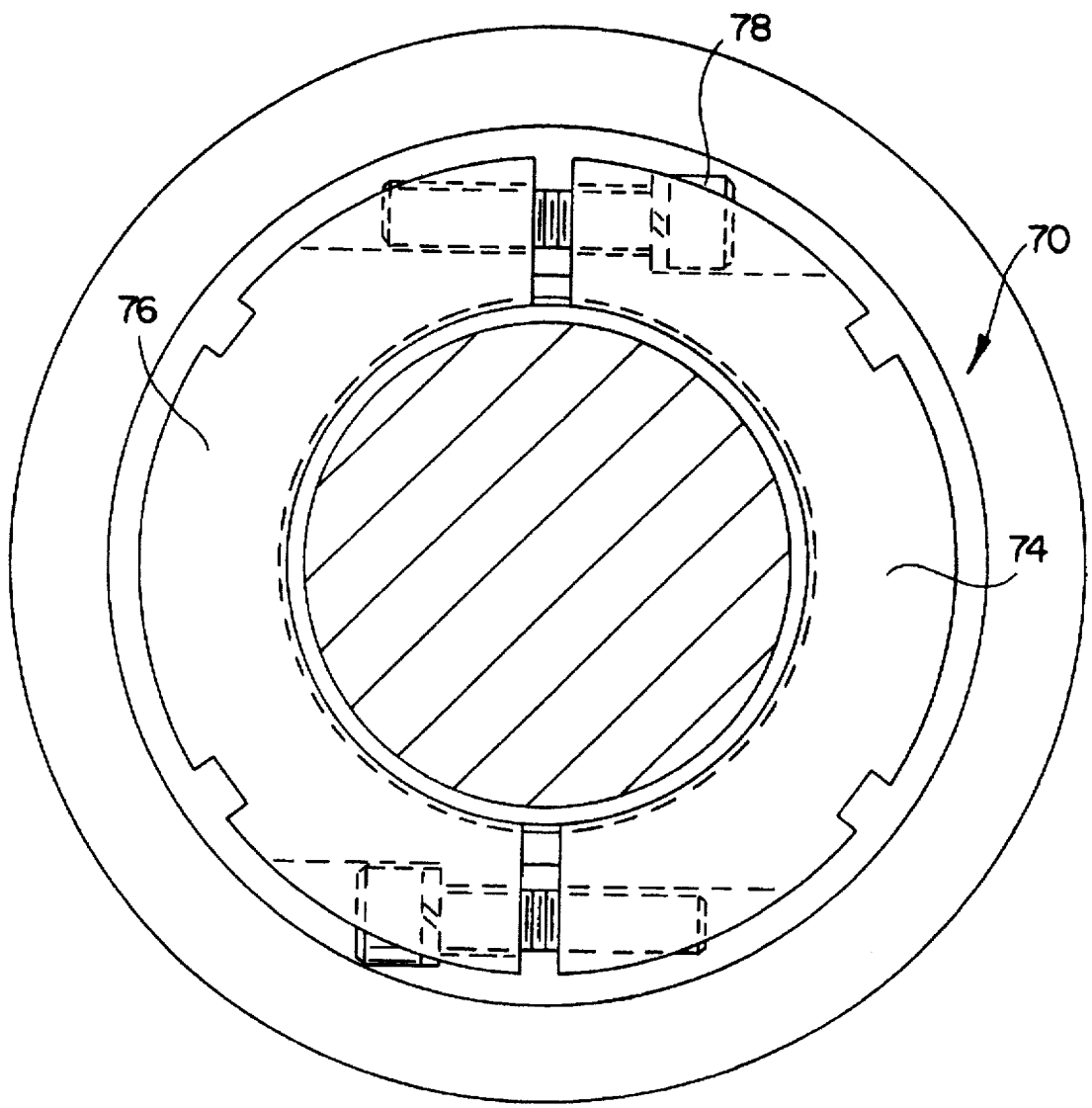
FIG. 6 is a front elevational view of the bearing assembly of FIG. 5 as taken along lines 6—6.

FIGS. 5 and 6 illustrate a further embodiment which does not require the use of arcuate members as described above.

Instead, nut 70 defines a circumferential lip 72 extending about its inner surface. Lip 72 engages the groove defined in extension portion 34 of inner ring member 16. Thus, rotation of nut 70 will cause relative axial movement between adapter 14 and inner ring member 16 as described above.

As can be most clearly seen in FIG. 6, nut 70 is constructed of a pair semicircular nut segments 74 and 76. Segments 74 and 76 each define an arcuate shaft receiving portion as shown. Bolts, such as bolts 78, are provided so that segments 74 and 76 may be secured into a rigid member. As a result, a circular interior is defined for receiving extension portions 32 and 34.

Figure 7:
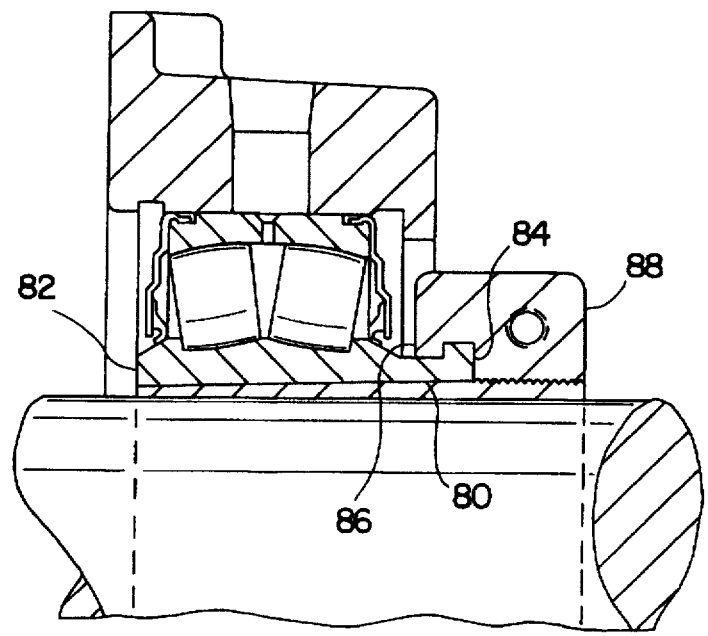
FIG. 7 is a partial cross-sectional view of a still further embodiment of a bearing assembly constructed in accordance with the present invention.

A further embodiment similar in many respects to the embodiment of FIGS. 5 and 6 is also illustrated in FIG. 7. In this case, however, an extension portion 80 of inner ring member 82 defines a flange 84 for engaging a lip 86 of nut 88. Again, nut 88 comprises a plurality of nut segments secured together into a rigid member.

Figure 8:
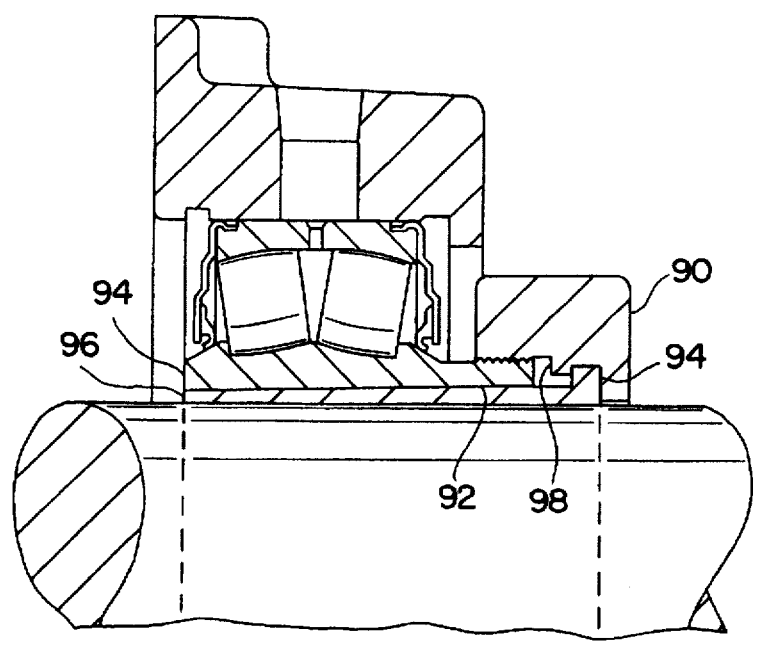
FIG. 8 is a partial cross-sectional view of a still further embodiment of a bearing assembly constructed in accordance with the present invention.

FIG. 8 illustrates an additional embodiment utilizing a unitary nut 90. Unlike the embodiments illustrated above, inner threads on nut 90 engage outer threads defined about extension portion 92 of inner ring member 94. Further, a flange 94 is located on the larger diameter end of tapered adapter 96. It can be seen that flange 94 is received in a groove defined in nut 90. On one side, this groove is defined by a flange 98. The diameter of flange 98 is chosen so that it will remain less than the outer diameter of flange 94 when situated on shaft 12. However, the diameter of flange 98 is configured to be greater than the diameter of flange 94 when the radial slot of tapered adapter 96 is closed. Thus, tapered adapter 96 may be contracted prior to being fitted on shaft 12 in order to connect tapered adapter 96 and nut 90.

Figure 9:
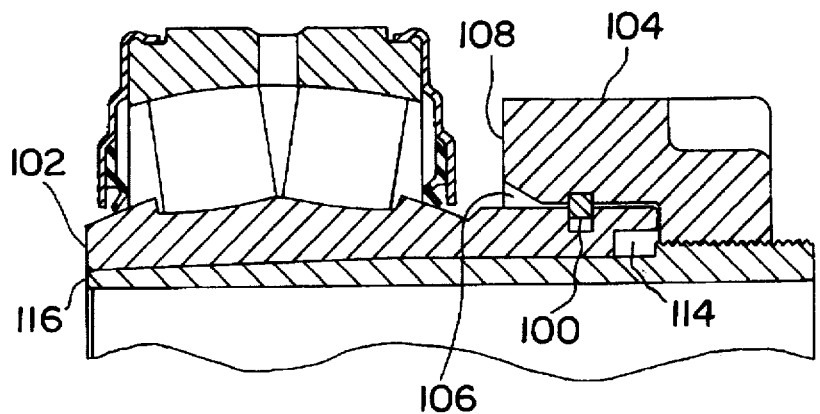
FIG. 9 is a partial cross-sectional view of a still further embodiment of a bearing assembly constructed in accordance with the present invention.
Figure 10:
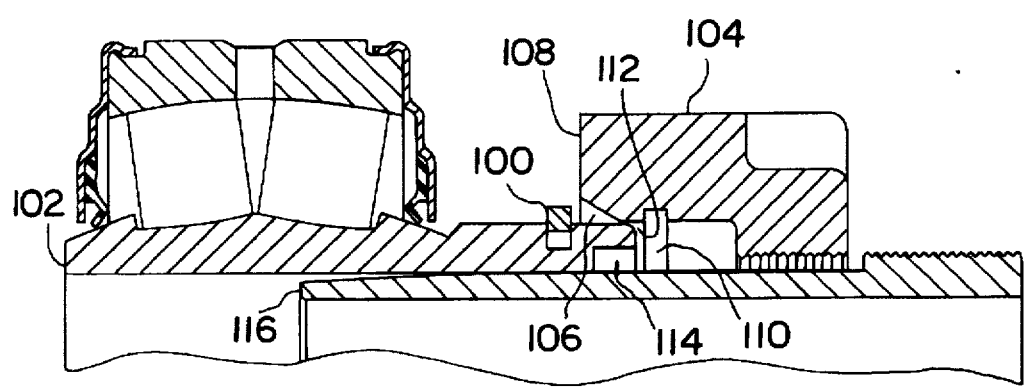
FIG. 10 is a partial cross-sectional view of the bearing assembly of FIG. 9 showing various components thereof axially separated prior to assembly.

FIGS. 9 and 10 illustrate a still further embodiment which may be assembled without the use of radial set screws or two-piece nuts. In this case, the arcuate member comprises a snap ring 100 which extends substantially about the entire circumference of inner ring member 102. Preferably, snap ring 100 defines a small angular gap to facilitate radial compression.

A unitary nut 104 is provided defining thereon a loading surface 106. As shown, loading surface 106 tapers from the axial end 108 of nut 104 back toward circumferential groove 110. Loading surface 106 preferably terminates prior to intersecting groove 110, thus leaving an untapered portion 112 therebetween. Inner ring member 102 may be provided with a small indentation 114 to provide clearance for the exterior threads of tapered adapter 116.

Figure 11A:
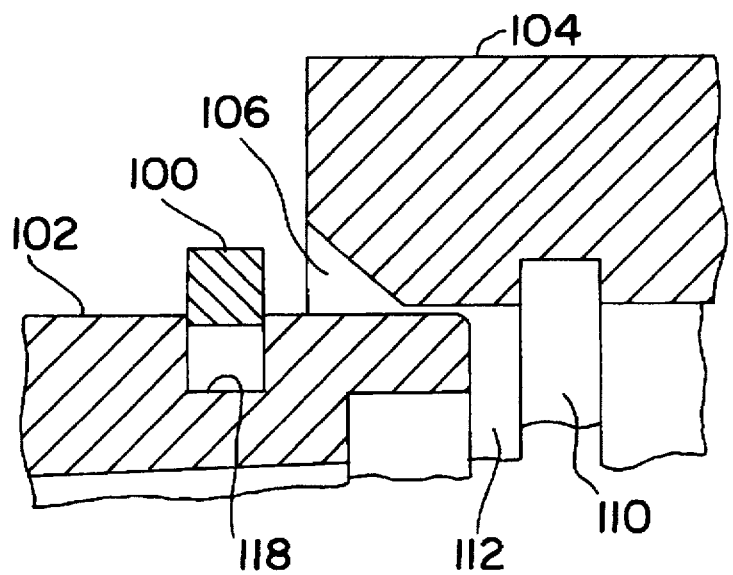
FIGS. 11A through 11D are enlarged partial cross-sectional views illustrating attachment of the nut and inner ring member of the bearing assembly of FIG. 9.

FIGS. 11A through 11D illustrate a method by which the bearing assembly of FIGS. 9 and 10 may be assembled. Referring particularly to FIG. 11A, nut 104 is shown axially separated from inner ring member 102, in a position similar to that shown in FIG. 10. As can be seen, snap ring 100 is expanded such that only a small portion thereof is located in the circumferential groove 118 of inner ring member 102. It will be appreciated that snap ring 100 may be easily slid into this position, such as by hand.

Figure 11B:
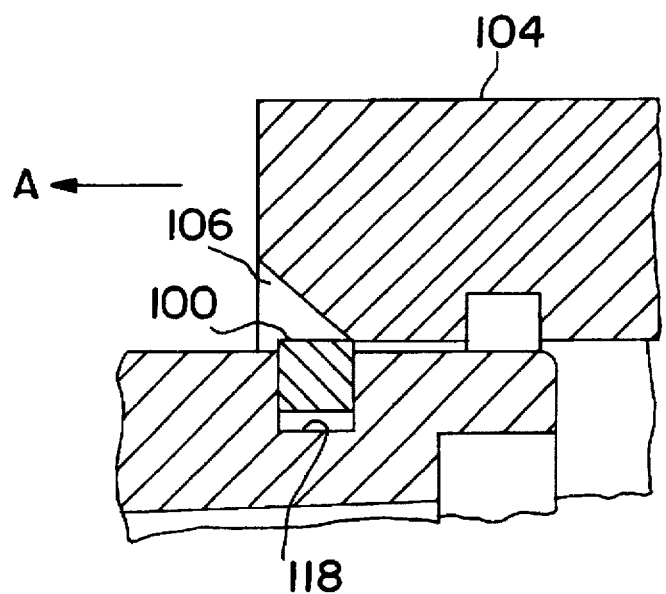
Figure 11C:
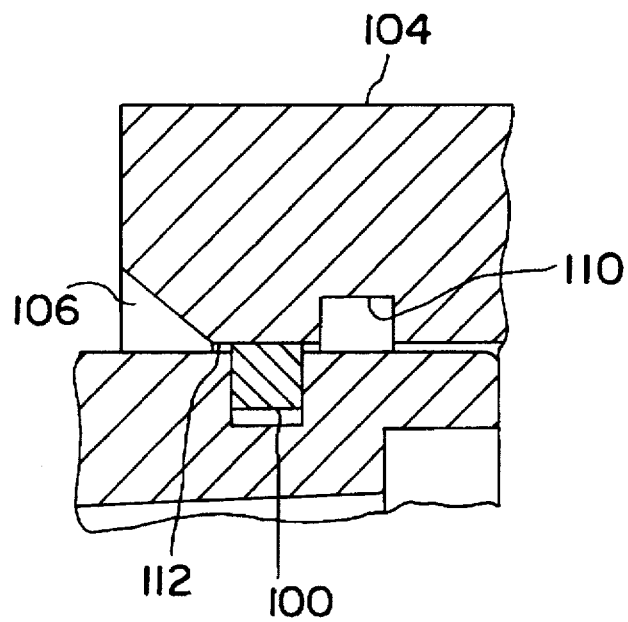

Referring now to FIG. 11B, nut 104 is next moved axially in the direction indicated by arrow A. In this case, loading surface 106 will engage snap ring 100, causing it to radially compress. As a result, snap ring 100 will be forced deeper into groove 118. Such compression of snap ring 100 will allow passage of untapered portion 112 of nut 104, as shown in FIG. 11C.

Figure 11D:
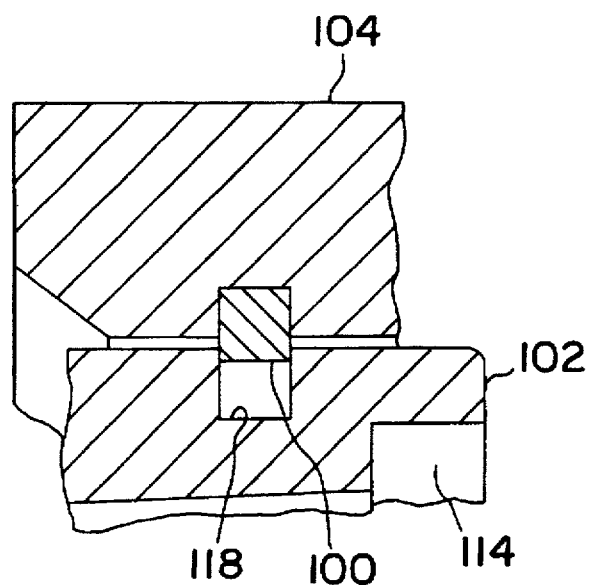

FIG. 11D illustrates the final position of snap ring 100. As can be seen, grooves 110 and 118 are now in the desired aligned position and snap ring 100 has naturally expanded into groove 110. A portion of snap ring 100 remains in groove 118, however, to provide a connection between nut 104 and inner ring member 102. As a result, rotation of nut 104 will cause inner ring member 102 and tapered adapter 116 to be drawn together in the manner described above.

While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for receipt of a shaft therein, said bearing assembly comprising:

a tapered adapter defining a first axial bore for receipt of the shaft therethrough and having a radial slot extending along the length thereof, said tapered adapter further defining a tapered outer surface and including a first extension portion axially extending from a greater diameter end of said tapered outer surface;

a bearing inner ring member defining an inner raceway about an outer surface thereof and further defining a second axial bore having a tapered inner surface for receipt of said tapered adapter therein, said bearing inner ring member including a second extension portion axially extending from a greater diameter portion of said tapered inner surface;

a bearing outer ring member defining an outer raceway about an inner surface thereof, said bearing outer ring member situated such that said outer raceway is radially outward of said inner raceway;

a plurality of bearing elements disposed between said bearing inner raceway and said bearing outer raceway;

a nut having a first axial portion for receipt around said first extension portion and a second axial portion for receipt around said second extension portion;

said second extension portion of said bearing inner ring member and said second axial portion of said nut defining respective circumferential grooves situated during use in radial opposition to define an annular space; and an annular, radially compressible connection ring operatively disposed in said annular space;

wherein said nut comprises a loading surface tapering from an axial end of said second axial portion toward said circumferential grooves.

2. A bearing assembly as set forth in claim 1, wherein said respective circumferential groove of said second extension portion is defined having sufficient depth to receive said annular connection ring during alignment with said respective circumferential groove of said second axial portion.

3. A bearing assembly as set forth in claim 1, wherein said first extension portion of said tapered adapter defines outer threads and said first axial portion of said nut defines inner threads, said outer threads operatively engaging said inner threads.

4. A bearing assembly as set forth in claim 3, wherein said nut comprises a unitary nut having said first axial portion and said second axial portion.

5. A clamping arrangement for securement to an elongated shaft, said clamping arrangement comprising:

a tapered adapter defining an axial bore for receipt of the shaft therethrough, said tapered adapter further defining a tapered outer surface extending between a first end of lesser diameter and a second end of greater diameter than said first end, said tapered adapter further having a first extension portion axially extending from one of said first end and said second end;

an annular element defining an axial bore for receipt of said tapered adapter therein, said annular element further defining a tapered inner surface extending between a third end of greater diameter and a fourth end of lesser diameter than said third end, said annular element further having a second extension portion axially extending from one of said third end and said fourth end such that said second extension portion will be proximate to said first extension portion during use;

one of said first extension portion and said second extension portion defining a first circumferential groove extending about at least a portion of an outer surface thereof, another of said first extension portion and said second extension portion defining threads about an outer surface thereof;

a nut having a first axial portion for receipt around said first extension portion and a second axial portion for receipt around said second extension portion;

one of said first axial portion and said second axial portion having threads defined about an inner surface thereof for engaging said threads defined on a corresponding one of said first extension portion and said second extension portion, another of said first axial portion and said second axial portion defining a second circumferential groove extending about at least a portion of an inner surface thereof radially aligned in use with said first circumferential groove; and an annular, radially compressible ring member configured for receipt in said first circumferential groove and said second circumferential groove such that rotation of said nut will effect axial movement of said annular element with respect to said tapered adapter.

6. A clamping arrangement as set forth in claim 5, wherein said nut defines a loading surface tapering from an axial end of said another of said first axial portion and second axial portion back toward said second circumferential groove.

7. A clamping arrangement as set forth in claim 6, wherein said first extension portion axially extends from said second end of said tapered adapter and said second extension portion axially extends from said third end of said annular element.

8. A clamping arrangement as set forth in claim 7, wherein said threads are defined on said first extension portion and said first circumferential groove is defined in said second extension portion.

9. A clamping arrangement as set forth in claim 5, wherein said first circumferential groove is defined having sufficient depth to receive said annular ring member during alignment of said first circumferential groove and said second circumferential groove.

10. A clamping arrangement as set forth in claim 5, wherein said nut includes at least one axial screw engaging said second extension portion, said at least one axial screw actuatable to facilitate separation of said tapered adapter and said annular member.

11. A clamping arrangement as set forth in claim 10, wherein said annular element defines a bearing raceway about an outer surface thereof.

12. A method of securing a bearing assembly to a shaft, said method comprising the steps of:

(a) providing apparatus comprising:

(1) a tapered adapter defining a first axial bore for receipt of the shaft therethrough and having a radial slot extending along the length thereof, said tapered adapter further defining a tapered outer surface and including a first extension portion axially extending from a greater diameter end of said tapered outer surface, said first extension portion defining outer threads thereabout;

(2) a bearing assembly including an inner ring member defining a second axial bore having a tapered inner surface for receipt of said tapered adapter therein, said bearing inner ring member including a second extension portion axially extending from a greater diameter portion of said tapered inner surface, said second extension portion defining a first circumferential groove about an outer surface thereof;

(3) a nut having a first axial portion for receipt about first extension portion and a second axial portion for receipt about said second extension portion, said first axial portion defining interior threads and said second axial portion defining a second circumferential groove about an inner surface thereof, said nut further defining a loading surface tapering from an axial end of said second axial portion back toward said second circumferential groove; and (4) an annular, radially-compressible snap ring sized to be received in an annular space between said first and second circumferential grooves;

(b) placing said bearing assembly on said tapered adapter such that said tapered outer surface and said tapered inner surface are generally complementary;

(c) inserting said snap ring into said first circumferential groove;

(d) moving said nut onto said inner ring member such that said loading surface will cause said snap ring to be compressed into said first circumferential groove;

(e) continuing to move said nut onto said inner ring member until said first circumferential groove and said second circumferential groove are in radial alignment, thereby causing expansion of said snap ring and connection of said nut and said inner ring member; and (f) rotating said nut to effect relative axial movement between said inner ring member and said tapered adapter, whereby said bearing assembly is secured to said shaft.

* * * * *